No. 755,138. Patented March 22, 1904.

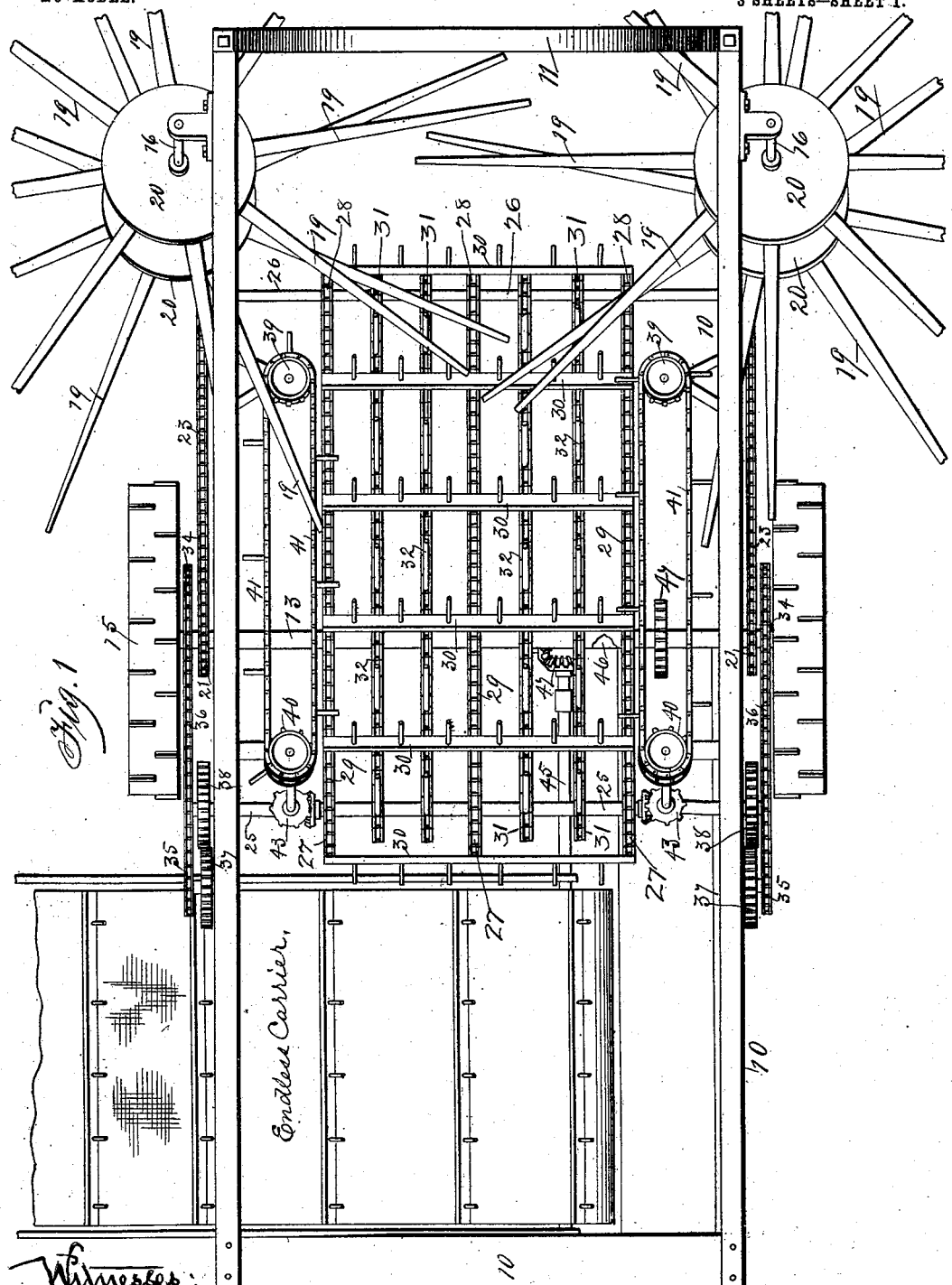

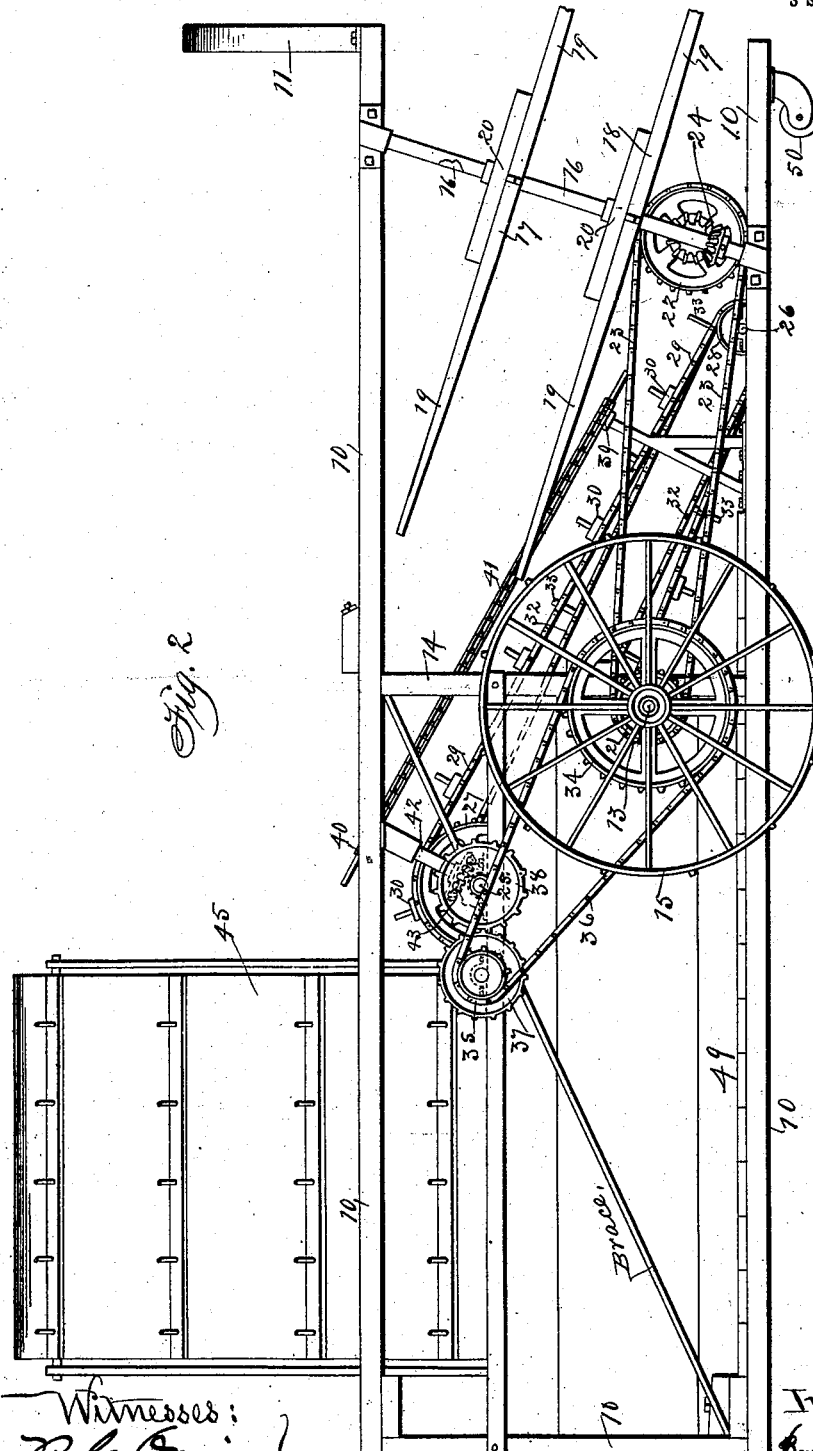

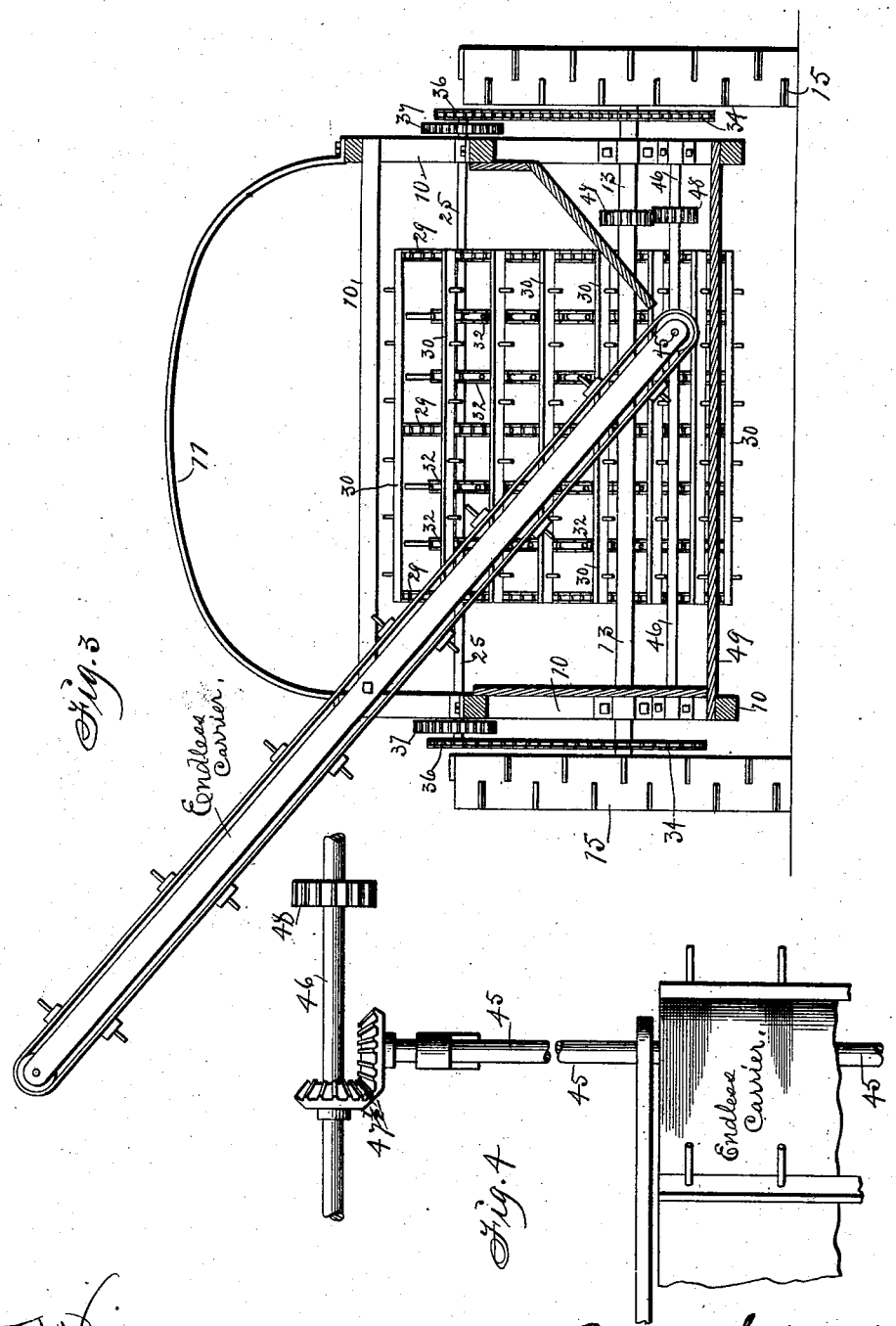

UNITED STATES PATENT OFFICE.

BENJAMIN S. KEMPTON, OF PATON, IOWA, ASSIGNOR, BY DIRECT AND MESNE ASSIGNMENTS, OF PART TO L. A. ROTHE, CHAS. F. LINNAN, AND F. B. KEELER, OF POCAHONTAS COUNTY, IOWA, AND D. M. KELLEHER, OF POLK COUNTY, IOWA.

MACHINE FOR LOADING BOUND GRAIN ON WAGONS.

SPECIFICATION forming part of Letters Patent No. 755,138, dated March 22, 1904.

Application filed November 4, 1901. Serial No. 81,154. (No model.)

*To all whom it may concern:*

Be it known that I, BENJAMIN S. KEMPTON, a citizen of the United States, residing at Paton, in the county of Green and State of Iowa, have invented a new and useful Machine for Loading Bound Grain on Wagons, of which the following is a specification.

This invention appertains to improvements in harvesters, more particularly to that class of harvesting-machines which are designed for loading cut grain, hay, or stalks, either bound in bundles or sheaves or when loose, as in cocks or windrows, from the ground to carriers, by means of which the hay or other produce is raised to such an elevation that it may be discharged or loaded in a wagon in attendance upon the machine.

The objects of my improvement are, first, to provide reels which are maintained to operate and gather the hay or other produce from the ground and deposit the same upon a carrier; second, to provide means for taking the material which is gathered and lifted by the reels from the arms thereof, so that the rotation of the reels will not be impeded by the material which is lifted to the carrier by the reels; third, to provide elevating mechanism which will coöperate with the reels when positioned to accomplish the ends in view, and, further, to provide a machine of improved construction for gathering crops from fields after the crops have been cut and cured, so as to expeditiously load the same on wagons.

The machine herein shown embodies one type of my invention, there being illustrated a hay-loader of the side-delivery type having inclined carriers and reels made and arranged in accord with my invention; and the invention consists in the construction, arrangement, and combination of the parts to accomplish the ends in view, as will be hereinafter set forth, and particularly pointed out in the claims.

In the accompanying drawings, Figure 1 is a top plan view of the major portion of a machine for loading hay, grain, &c., on wagons. Fig. 2 is a side elevation. Fig. 3 is a fragmentary section taken through the rear portion of the frame looking toward the front, and in this view the reels are not present; and Fig. 4 is a detail view of one of the endless carriers and a part of the driving mechanism therefor.

The body or frame of the machine may be of any suitable construction and material and is open at the front end, which is supported by caster-wheels 50, attached to the lower sill-pieces of the frame at their forward ends. The upper side bars of the frame are connected by an arch 11 of sufficient height to admit a sheaf or bundle of grain beneath such arch. The upper parallel bars of the frame 10 are connected by transverse beams or bars, and the sill-pieces have a floor 49, which extends forward of the supporting-wheels 15. A rearwardly-projecting tongue 12 is attached to the rear lower portion of the frame, the draft-animals being hitched to the tongue to move the machine forward in advance of such animals. The parallel side bars of the frame near their centers have uprights or connecting-bars 14 14, which carry journal boxes or bearings, through which passes a rotary axle 13, to which is rigidly secured the supporting or traction wheels 15 15. Below the journal-boxes for the axle 13 are boxes or bearings for a shaft 46. To the rear uprights of the frame and to the uprights or bars 14 there are secured bars, which are maintained parallel with the upper and lower bars of the frame, and upon the same are bearings for a transverse shaft 25 and for outwardly-projecting stub-shafts, to which are rigidly attached gear and sprocket wheels 37 and 35. To the forward portion of the lower bars of the frame are journal-boxes for a shaft 26, bearings also being provided for stub-shafts which carry beveled gears and sprocket-wheels 22, the beveled gears meshing with similar gears on inclined reel-carrying shafts 16 16, which are journaled in brackets which project outward from the upper and lower bars of the frame. From the sill-pieces of the frame, so as to be parallel or approximately parallel with the shafts 16, are brackets or bearings which carry shafts or supports for sprocket-wheels 39, which are attached to the upper ends of said shafts. The upper bars of the frame rear of the uprights 14 carry hangers 42, through which pass inclined shafts having at their upper ends sprocket-wheels 40 and at their lower ends miter-gears 43, which mesh with miter-gears which are keyed upon the shaft 25, which constitutes the upper shaft of an endless carrier, said shaft 25 having keyed thereon sprocket-wheels 27, over which pass chains 29, to which are attached slats 30, having projecting pins. The chains 29 pass over sprocket-wheels 27 and 28, which are rigidly attached to the shafts 25 and 26. Upon the shaft 26 between the sprocket-wheels 28 there are rigidly attached sprocket-wheels 31, similar sprocket-wheels being mounted in line therewith on the shaft 25, such sprocket-wheels being mounted loosely on the driven shaft 25. The chains 32 are provided with fingers 33, which are spaced at the same distance apart as the slats 30, and it will be noted that by the construction shown the fingers of the chains 32 operate between the slats, and as the grain is moved upward they pass below the plane of the upper slatted carrier-belt and at the upper end of the belt are entirely within the same and out of engagement with the grain carried by the carrier, which passes over the larger sprocket-wheel 27.

By the construction illustrated I provide practically two carrier-belts, which act in conjunction with each other where the grain is received thereon, and as the grain is raised and reaches the point for delivery the fingers of one of the carrier-belts are automatically and positively moved out of contact with the grain to insure certain discharge from the carrier.

The main carrier-belt is of considerably less width than the distance between the longitudinal bars of the frame, and there are mounted, so as to operate in close proximity vertically and at a slight distance above the carrier-belt, chains 41, which engage the sprocket-wheels 39 and 40, said chains having fingers which project over the outer side chains of the slatted endless carrier. These side belts or carriers extend forward considerably beyond the path of the arms of the reels and are below the line of travel of said arms. They also move at a higher ratio of speed than the carrier-belts and reels, so that they will quickly engage and move any hay, straw, or stalks from the arms of the reels, and by taking it therefrom the rotation of the arms or reels will not be impeded.

The axle of the traction-wheels carries sprocket-wheels 34, over which pass chains which also engage and drive smaller sprocket-wheels 35 on the stub-shafts, which stub-shafts also carry gear-wheels 37, which mesh with gear-wheels 38 on the shaft 25, which shaft drives the horizontal and the vertically-disposed carrier-belts.

On the axle 13 is a gear-wheel 47, which meshes with a gear-wheel 48 on the shaft 46, said shaft having a miter-gear $47\frac{1}{2}$, which meshes with a similar miter-gear 47 on a shaft 45, which shaft drives an endless carrier disposed at right angles to the carriers hereinbefore described. This endless carrier operates over a frame which is supported at its lower end by the shaft 45, the side pieces of the frame which support the upper roller being suitably attached to the frame of the machine.

The frame 10 is provided with side boards, and one of the boards terminates above the lower end of the endless carrier 455, so that should any hay or grain fall from the first carrier on the inclined board it would be taken therefrom. This board also directs any seed upon the floor, where it is retained.

The reels are driven by sprocket-chains 23 23, which pass over sprocket-wheels 21 on the axle 13, and the chains 23 also engage sprockets 22. The miter-gears meshing with the gears 24 turn the shaft 16 at a comparatively high rate of speed—that is, much faster than the forward travel of the machine or the carrier 30.

Upon the forwardly-inclined shafts 16, which are geared so as to be turned toward each other, are attached disks 20, said disks carrying arms 19, which are arranged slightly out of line when viewed from the top, so that the arms of the upper reels 17 will be slightly in advance of the lower arms 18 when said reels are acting to lift the hay or grain. In operation the reels turn toward each other, the arms of one reel passing between the arms of the other reel, and said arms move in planes which are inclined to the horizontal, so that in operation the ends of the arms as the reels are rotated will move toward the surface of the ground, engage the hay or grain thereon, lift the same, and place it upon the endless carrier, and if sheaves or cocks are to be gathered they will be lifted and inclined slightly forward with the heads toward the rear end of the machine as they are placed on the first carrier.

It will be noted that the radial arms of the reel are in parallel planes and that from their outer ends beyond the side frames of the machine they commence a downward movement which will gather in the grain, and as the arms pass rearward they rise to lift what is gathered thereby and place it on the carrier-belt, and if any of the grain adheres it will be drawn off the arms by the quick-moving belts or carriers 41. The disks 20 can be adjusted vertically on their shafts to change vertically the position of the arms.

I do not wish to confine myself to the special construction of the frame herein shown, the particular form of gearing, or to a pole attached at the rear of the machine, and

Having thus described my invention, what I claim as new, and desire to secure by Letters Patent, is—

1. In a sheaf gatherer and loader, a frame, supporting-wheels therefor, a pair of reels which both gather and lift, bearings attached to the frame to maintain the shafts of the reels in a position whereby the radiating arms carried by the shafts travel in intersecting paths which are upward and rearward over the forward portion of the frame.

2. In a machine of the kind described, an inclined conveyer, clearing-bands maintained at a higher plane than the conveyer and actuated at a faster rate of travel than the conveyer, gathering and lifting reels having radial arms, the shafts of the reels being maintained so that the arms thereof will move in forward and downward inclined orbits and over the forward portions of the conveyer and clearing-bands.

3. In a machine for the purpose set forth, the combination with an inclined conveyer, of gathering and lifting reels maintained so that the shafts of the reels will be inclined forward with respect to the frame, the upper ends of the shafts from which project the arms of the reels being in advance of the lower ends.

4. In a machine for gathering shocks or sheaves, a frame, an inclined conveyer mounted between the side bars of the frame, and a pair of rotatable reels having radial arms, the shafts of the reels being maintained so the upper ends will be forward of the lower ends, the arms of the reels moving in forward and downward inclined orbits with respect to the line of travel of the machine.

5. In a machine for the purpose set forth, an open-ended frame, a conveyer maintained between the side bars of the frame, reels comprising shafts and radial arms, the shafts being forwardly and upwardly inclined with respect to the frame and to the direction of travel of the machine, the arms of each reel as they approach each other moving rearward and upward to engage and lift sheaves from the ground and place them on the conveyer, substantially as set forth.

6. In a machine for the purpose set forth, a frame, a conveyer between the side bars of the frame, and a pair of coacting reels, the shafts of the reels being connected to the forward portion of the frame and maintained so the upper ends of the shafts will be forward of the lower ends; or forwardly inclined with respect to the line of travel of the machine; and an upper and a lower set of arms on each shaft which project at right angles from the forwardly-inclined shafts, substantially as shown.

7. In a machine for the purpose set forth, the combination with an endless carrier, of reels mounted in advance and on opposite sides of the carrier, the arms on each reel being of a length sufficient to extend beyond the longitudinal center of the carrier.

8. In a machine for the purpose set forth, the combination with a frame, an endless carrier, a pair of reels mounted on the frame in advance of and on opposite sides of the carrier, the reels comprising shafts which are maintained at a forward and upward inclination with respect to the frame and direction of travel of the machine, two sets of radial arms attached to each shaft, the arms on one shaft being opposite to those on the other shaft and arranged so that the arms on one shaft will enter the interstices between the arms of the opposite shaft, substantially as shown.

9. In a machine for the purpose set forth, the combination with inclined endless conveyers maintained at right angles one to the other and one in advance of the other, of endless belts with projecting fingers operatively supported at a higher elevation than the front part of the forward elevator and having a higher rate of travel than said elevator, and gathering and lifting reels supported to operate in front and above the forward portions of the first elevator and the endless belts, substantially as shown.

10. In a device of the class described, the combination with a frame, of two shafts rotatably attached at the front end of said frame and extending forwardly and upwardly therefrom, and coacting arms on the shafts to gather and lift shocks or sheaves.

11. In a device of the class described, the combination of a frame, an endless carrier, sheaf gathering and lifting means comprising rotatable shafts attached to the front portion of the frame in bearings which maintain the shafts at an upward and forward inclination with respect to the frame and to the line of travel of the machine, and gathering and lifting arms on each shaft, for the purpose set forth.

BENJAMIN S. KEMPTON.

Witnesses:
J. W. HUNTINGTON,
CHAS. HALEY.